United States Patent
Sudo et al.

[11] Patent Number: 5,986,780
[45] Date of Patent: *Nov. 16, 1999

[54] HOLOGRAM RECONSTRUCTING APPARATUS

[75] Inventors: Toshiyuki Sudo, Kawasaki; Eiji Hasegawa, Tokyo, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/797,850

[22] Filed: Feb. 10, 1997

Related U.S. Application Data

[63] Continuation of application No. 08/605,452, Feb. 26, 1996, abandoned, which is a continuation of application No. 08/298,105, Aug. 30, 1994, abandoned.

[30] Foreign Application Priority Data

Sep. 1, 1993 [JP] Japan ................................. 5-217564

[51] Int. Cl.$^6$ .................. G02B 27/22; G03H 1/08; G03H 1/26
[52] U.S. Cl. ...................... 359/22; 359/9; 359/33; 359/462
[58] Field of Search ................... 359/9, 10, 11, 359/21, 22, 24, 25, 32, 33, 630, 462

[56] References Cited

U.S. PATENT DOCUMENTS

| | | |
|---|---|---|
| 3,514,176 | 5/1970 | Brooks et al. ............................ 359/33 |
| 3,583,784 | 6/1971 | Hanna et al. ............................. 359/33 |
| 3,658,402 | 4/1972 | Nishida et al. ........................... 359/33 |
| 3,871,740 | 3/1975 | Matsubara et al. ....................... 359/21 |
| 3,891,976 | 6/1975 | Carlsen ..................................... 359/21 |
| 4,109,996 | 8/1978 | Ersoy ......................................... 359/9 |
| 4,142,772 | 3/1979 | Lurie .......................................... 359/9 |
| 4,256,362 | 3/1981 | Bardos ..................................... 359/33 |
| 4,795,223 | 1/1989 | Moss ........................................ 359/32 |
| 4,807,971 | 2/1989 | Nurano ..................................... 359/32 |
| 4,834,475 | 5/1989 | Robinson ................................. 359/32 |
| 4,889,780 | 12/1989 | Cosner .................................... 359/322 |
| 4,896,929 | 1/1990 | Haas et al. .............................. 359/32 |
| 4,961,625 | 10/1990 | Wood et al. ............................ 359/630 |
| 5,028,912 | 7/1991 | Iino ......................................... 359/630 |
| 5,109,289 | 4/1992 | Poleshuk ................................. 359/32 |
| 5,121,229 | 6/1992 | Benton et al. ........................... 359/32 |
| 5,138,471 | 8/1992 | McGrew .................................. 359/21 |
| 5,384,573 | 1/1995 | Turpin ..................................... 359/32 |

*Primary Examiner*—Jon Henry
*Attorney, Agent, or Firm*—Morgan & Finnegan LLP

[57] ABSTRACT

This specification discloses a hologram reconstructing apparatus having interference fringe forming means for forming optical interference fringes in conformity with an input signal, information input means for successively inputting different bits of interference fringe information to the interference fringe forming means, and illuminating means for illuminating the interference fringe forming means with a plurality of beams of light differing in wavefront from one another.

9 Claims, 6 Drawing Sheets

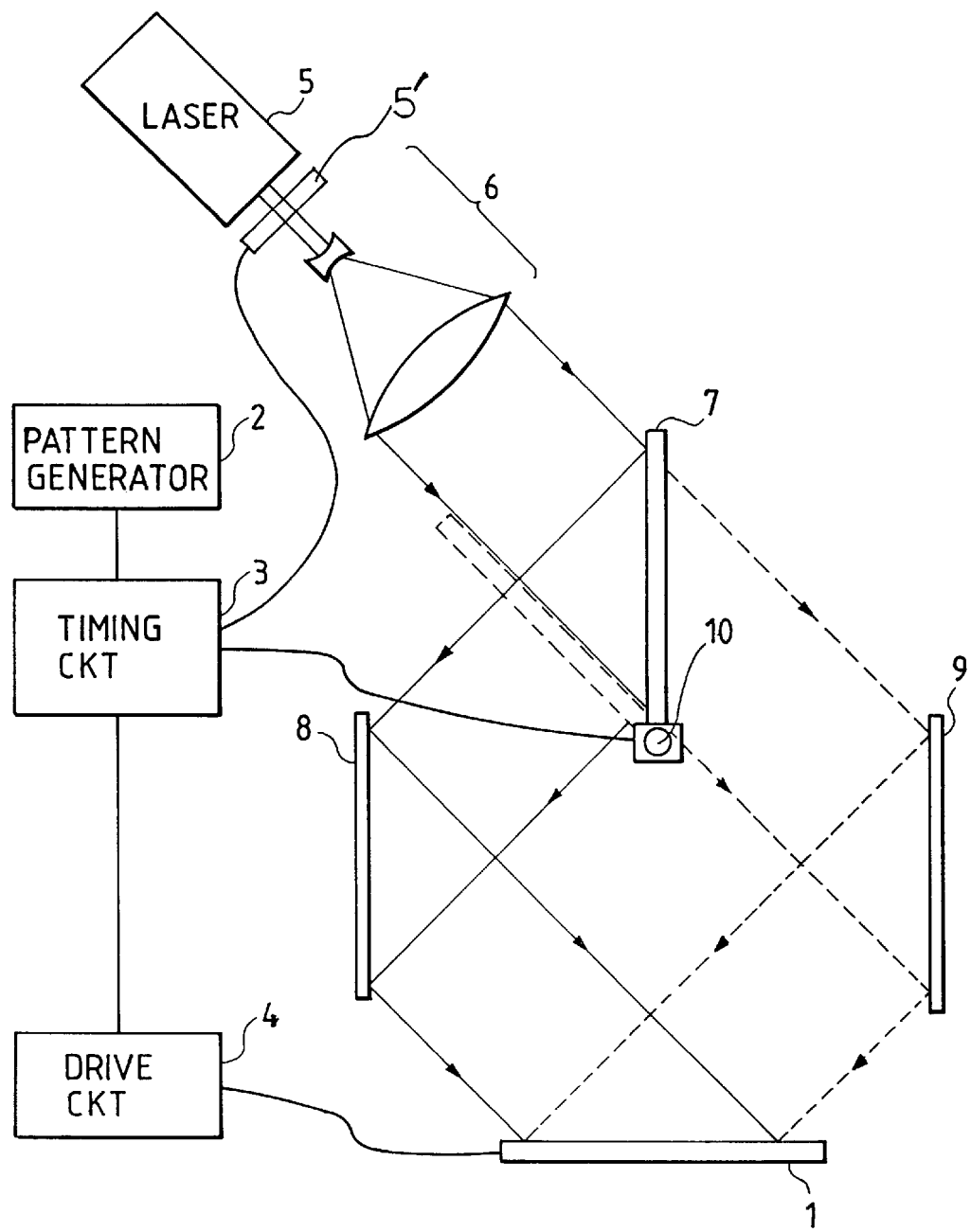
FIG. 2
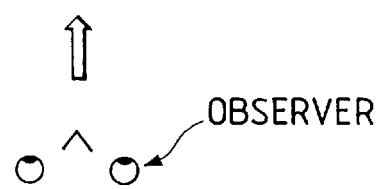

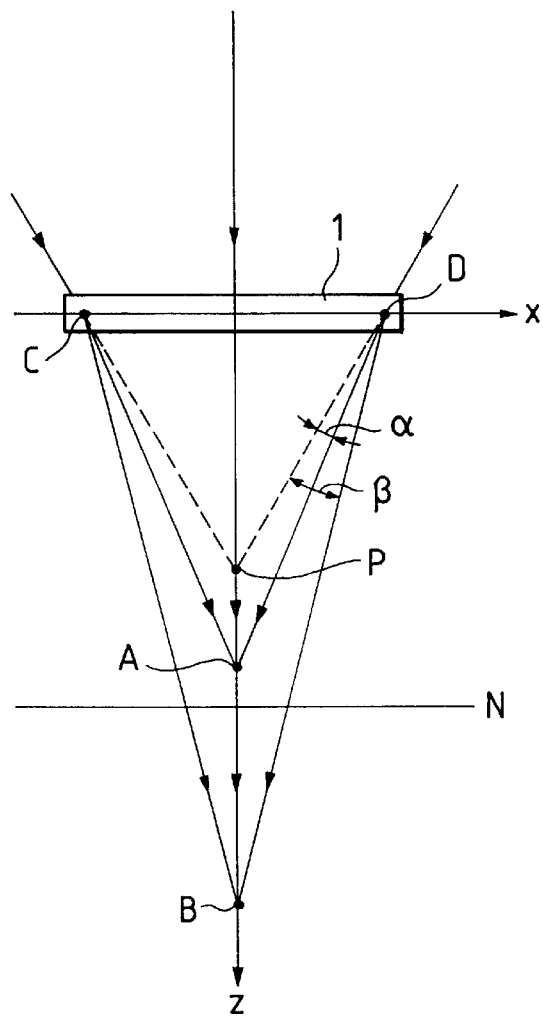
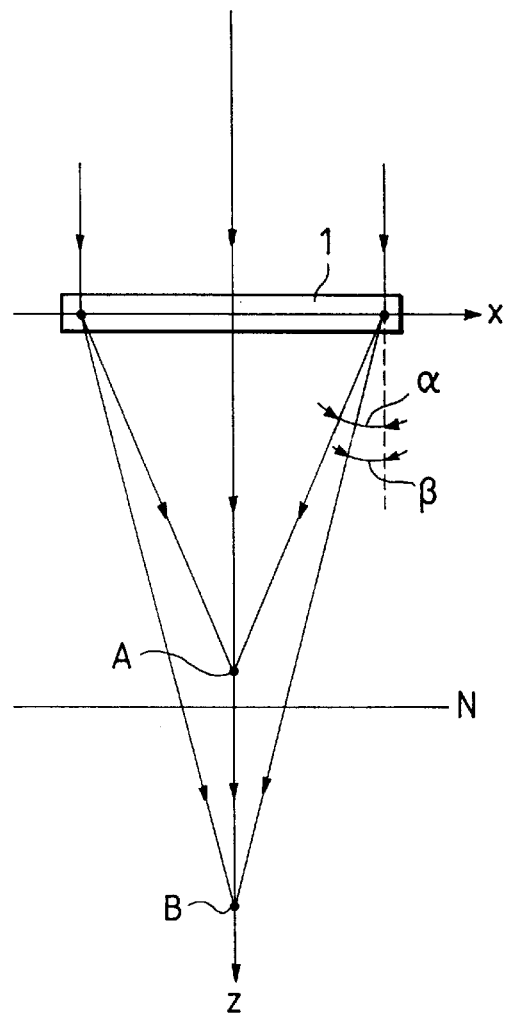

HOLOGRAM RECONSTRUCTING APPARATUS

This is a continuation of application Ser. No. 08/605,452, filed on Feb. 26, 1996 now abandoned, which is in turn a continuation of application Ser. No. 08/298,105, filed on Aug. 30, 1994 now abandoned.

BACKGROUND OF THE INVENTION

1. Field of the Invention

This invention relates to a hologram reconstructing apparatus for reconstructing three dimensional images.

2. Related Background Art

Holography is a technique for enabling three dimensional images to be reconstructed by recording and reconstructing the phase and amplitude of light, but since it is necessary to record and reconstruct minute interference fringes formed by a laser beam, a photo-sensitive material of very high resolusion or the like has long been used as a recording medium for said interference fringes and necessarily, reconstructed images have been limited to stationary ones.

In recent years, however, with the advance of science and technology, spatial light modulators (such as liquid crystal optical elements or acousto-optical elements) having high resolusion and quick in response have been developed and the high-speed display of minute interference fringe patterns has become possible and therefore, a number of examples using these to construct a real time hologram (moving image hologram) reconstructing apparatus have come to be seen. Japanese Laid-Open Patent Application No. 1-84993 discloses a real time hologram reconstructing apparatus using a liquid crystal dot matrix display element. FIG. 1 of the accompanying drawings shows the construction of this apparatus. An interference fringe pattern for making the reconstruction of a desired three dimensional image is produced by a microprocessor 65 and an image control apparatus 64 in FIG. 1, and the interference fringe pattern is displayed as a black-and-white pattern on a liquid crystal dot matrix element by a driver circuit 62. If this pattern is illuminated by a laser beam emitted from a laser apparatus 63 and is observed from the direction of arrow A, the observer can observe a three dimensional image. Further, if the interference fringe pattern displayed on the liquid crystal dot matrix element is dynamically changed, a three dimensional moving image can be obtained.

However, the real time hologram reconstructing technique according to the conventional art has suffered from the following problems:

1) The manufacture of such a spatial light modulator of high resolusion which corresponds to a photosensitive material is difficult and the display of too minute an interference fringe pattern cannot be accomplished and further, faithful reconstruction of an intended three dimensional image is impossible, and 2) The amount of information of the interference fringe pattern displayed on the spatial light modulator is too enormous for the ability of a system for calculating and processing the interference fringe pattern to catch up with it.

SUMMARY OF THE INVENTION

It is the object of the present invention to provide a real time hologram reconstructing apparatus of high performance even if it uses a spatial light modulator of low resolving power and an interference fringe data producing system of low calculating and processing ability.

One form of the hologram reconstructing apparatus of the present invention for achieving the above object is characterized by interference fringe forming means for forming optical interference fringes in conformity with an input signal, information input means for successively inputting different bits of interference fringe information to said interference fringe forming means, and illuminating means for illuminating said interference fringe forming means with a plurality of beams of light differing in wavefront from one another.

A preferred form of the reconstruction areas of hologram images corresponding to said successively inputted bits of interference fringe information is characterized in that the areas differ from one another.

A preferred form of said illuminating means is characterized in that it successively illuminates said interference fringe forming means by said beams of light differing in wavefront from one another in synchronism with said successively inputted bits of interference fringe information.

A preferred form of said illuminating means is characterized in that it causes said beams of light differing in wave front from one another to enter said interference fringe forming means at a time.

A preferred form of said different reproduction areas is characterized in that they partly overlap one another.

A preferred form of said hologram images differing in reproduction area is characterized in that it forms a continuous three dimensional image.

A preferred form of said illuminating means is characterized in that it causes beams of light differing in wavelength from one another to enter said interference fringe forming means.

A preferred form of said information input means is characterized in that it successively inputs the different bits of interference fringe information to said interference fringe forming means within ¹⁄₆₀ second.

Some other features and specific forms of the present invention will become apparent from the following detailed description of some embodiments of the invention.

BRIEF DESCRIPTION OF THE DRAWINGS

FIG. 2 schematically shows the construction of an embodiment of the present invention.

FIGS. 5A and 5B illustrate the action of said another embodiment of the present invention.

Figure 1:
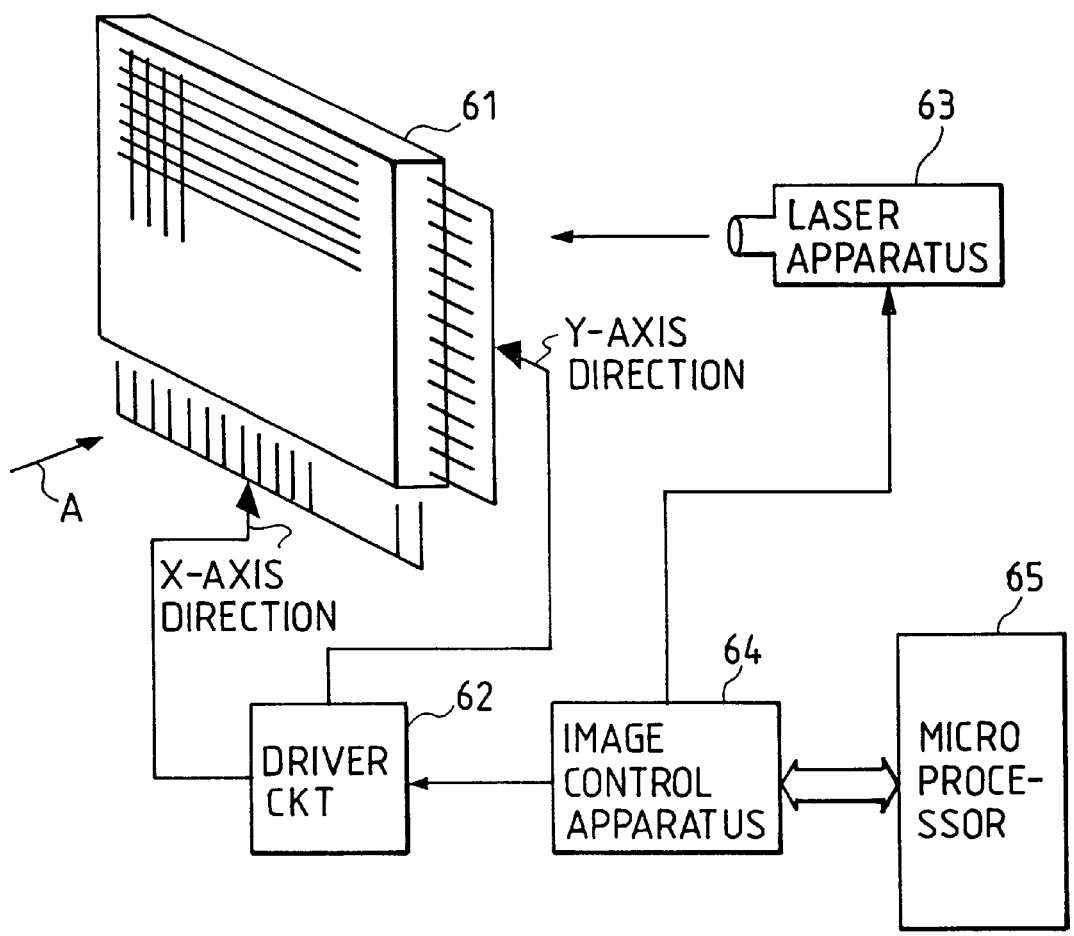
FIG. 1 schematically shows the construction of a real time hologram reconstructing apparatus according to the prior art.

DESCRIPTION OF THE PREFERRED EMBODIMENTS (First Embodiment)

FIG. 2 is a view of a real time hologram reproducing apparatus which is a first embodiment of the present invention as it is seen from vertically above it. In FIG. 2, the reference numeral 1 designates a spatial light modulator such as a liquid crystal optical element or an acoustooptic element. It is an aggregate of minute elements capable of changing over light transmittance on efficiency of diffraction to 0 and 1 or changing over to multiple stages, and is interference fringe forming means capable of displaying any interference fringe pattern. In the present embodiment, a liquid crystal display of two white/black tones is used as the spatial light modulator. Interference fringe pattern data is made by a pattern generator 2, is transmitted to a timing circuit 3 and a drive circuit 4, and is displayed on the liquid crystal display.

Figure 3A:
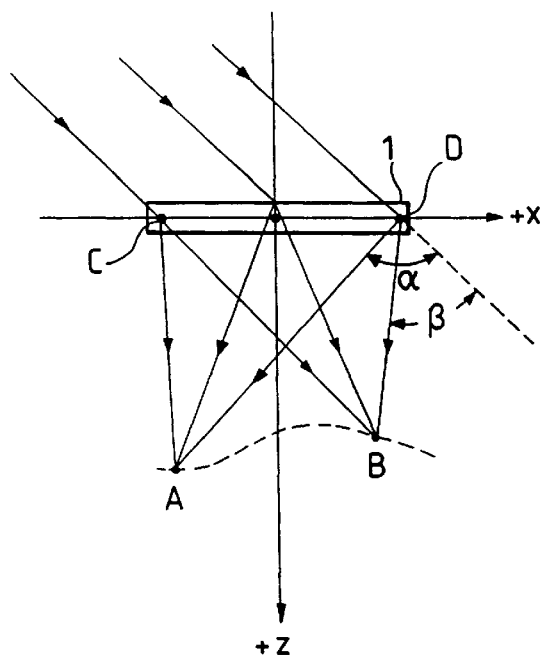
FIGS. 3A, 3B and 3C illustrate the action of the embodiment of the present invention.
Figure 3B:
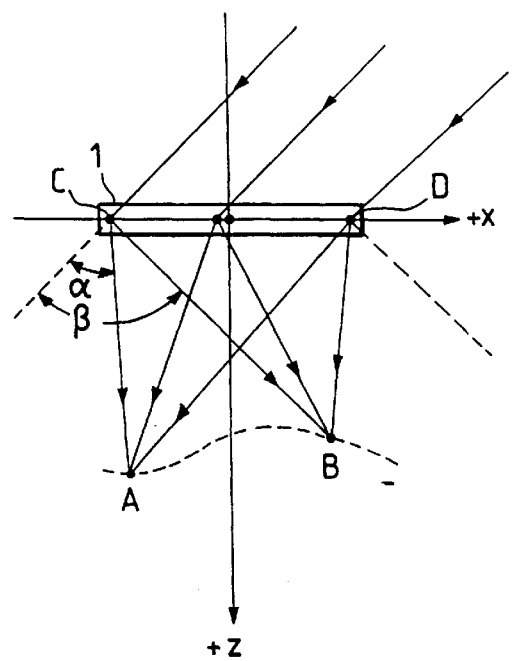
Figure 3C:
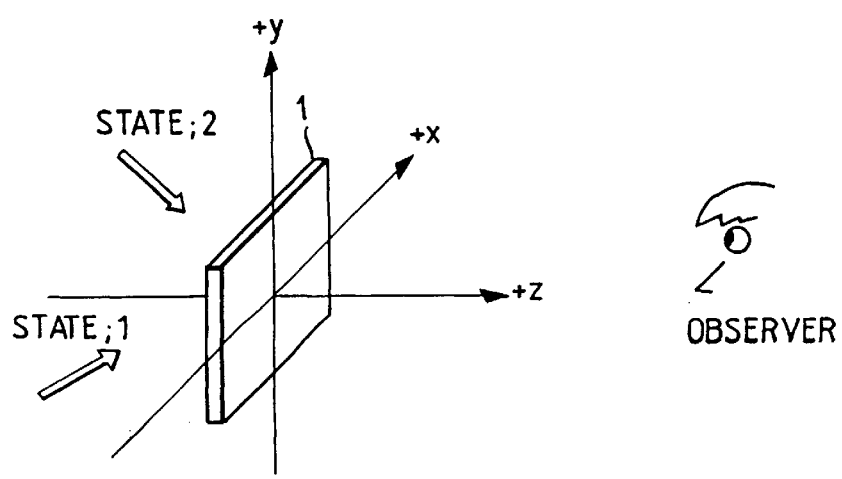

On the other hand, a visible laser beam emitted from a laser beam generator 5 is made into a parallel beam by a collimator lens system 6 and is sent to a mirror 8 or a mirror 9 depending on the direction of a rotatable mirror 7. In any case, the parallel beam enters the liquid crystal display 1 at a predetermined angle from a different direction. The direction of the rotatable mirror 7 is controlled by the timing circuit 3 in synchronism with the display of the interference fringe pattern onto the liquid crystal display, and the rotatable mirror 7 is driven by a motor 10. A light-intensity modulator 5' provided in an optical path of light of laser is operated by synchronizing the motion of the rotatable mirror 7 to generate pulse light, controlling transmittance such that the light of laser is incident on a liquid crystal optical element at the time of state where the light of laser is incident on the mirror 8 or the mirror 9. FIGS. 3A and 3B enlargedly show states in which the illuminating laser beam is reflected by the mirrors 8 and 9 each and enters the liquid crystal display 1, and the respective states are called state 1 and state 2. FIG. 3C shows a coordinate system to illustrate orientation of the liquid crystal display 1 and the illuminating light, and the direction and positional relation of an observer. These relations will hereinafter be described with reference to FIG. 3C. In the present embodiment, the observer observes an image from the positive direction of the z-axis. The illuminating light in state 1 enters the liquid crystal display while keeping its parallelism to xz plane from a point (−1, 0, −1) in the coordinates system toward the origin and keeping 45° with respect to the x-axis and z-axis. Also, the illuminating light in state 2 enters the liquid crystal display while keeping its parallelism to xz plane from a point (1, 0, −1) in the coordinates system toward the origin and keeping 45° with respect to the x-axis and z-axis. Also, the plane formed by the y-axis and z-axis is defined as the median plane M of the liquid crystal display. By the use of the above-described relations, the reconstructing method in the present embodiment will hereinafter be described with reference to FIGS. 3A and 3B.

It is apparent from FIGS. 3A and 3B that when the size of the three dimensional image reconstructed in state 1 (FIG. 3A) in x-direction is equal to or smaller than the liquid crystal display, the deflection angle of the ray of light (the deflection angle of the angle of emergence of reconstructing light relative to the angle of incidence of the illuminating light) at a right end point D on the liquid crystal display becomes greatest as compared with that at the other points on the liquid crystal display. Further, the deflection angle α of the ray of light at the point D when any point A at the left of the z-axis in FIG. 3A is reconstructed is always greater than the deflection angle β of the ray of light at the point D when any point B at the right of the z-axis in FIG. 3A. From the nature of a diffraction grating, to deflect the ray of illuminating light more greatly, it is necessary to make the grating pitch smaller. Consequently, it will be seen that in state 1 (FIG. 3A), an interference fringe pattern of a higher spatial frequency is required when any point A at the left of the z-axis is reconstructed. This also applies to a case where the size of the three dimensional image to be displayed in a direction parallel to the liquid crystal display is larger than the liquid crystal display. This also holds true of the case of state 2 (FIG. 3B). In state 2 (FIG. 3B), when any point A at the left of the median plane M is to be reconstructed and when any point B at the right of the z-axis is to be reconstructed, an interference fringe pattern of a higher spatial frequency is required in the latter case than in the former case.

So, in the present embodiment, the state of the illuminating light and the interference fringe pattern displayed are changed over at a high speed in synchronism with each other so that in state 1, only the area at the right of the z-axis may be reconstructed and that in state 2, only the area at the left of the z-axis may be reconstructed. Alternatively, the illuminating light in state 1 and the illuminating light in state 2 may be caused to enter the liquid crystal display at a time and the interference fringe patterns corresponding to the above-described respective states may be changed over at a high speed. By making the changeover speeds sufficiently high, the observer can observe continuous three dimensional images including the points A and B at a time owing to the afterimage effect.

By these methods, the maximum spatial frequency of the interference fringe pattern displayed in each state can be made lower than in the conventional art and the condition of resolution required of the liquid crystal display can be loosened. At the same time, the number of the interference fringes displayed in each state decreases and therefore, the amount of information of the data transmitted from the pattern generator 2 decreases and the conditions of calculation, processing and transmission speed required of the pattern generator 2 and the information transmitting system can be loosened.

(Second Embodiment)

Figure 4:
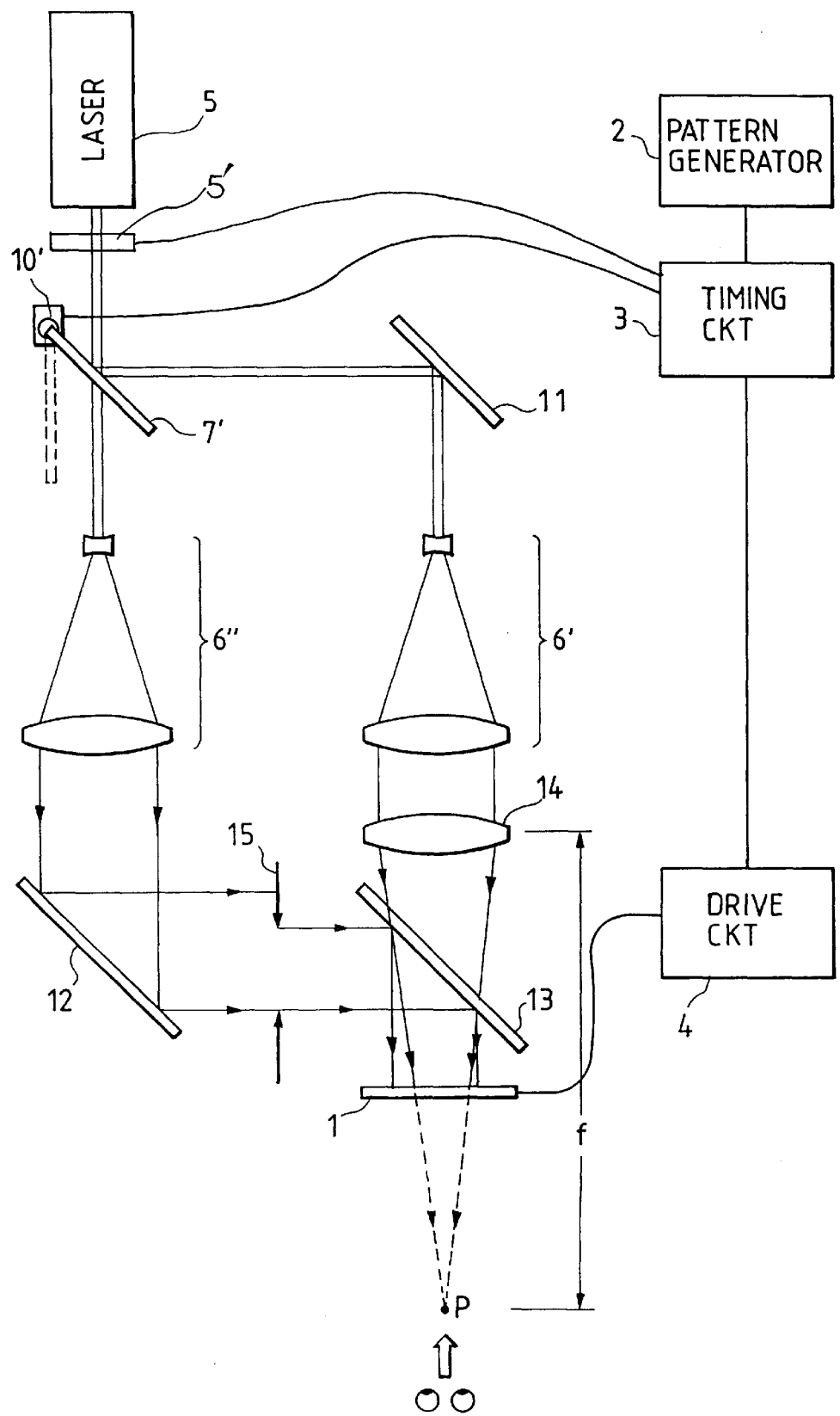
FIG. 4 schematically shows the construction of another embodiment of the present invention.

FIG. 4 is a view of a real time hologram reconstructing apparatus which is a second embodiment of the present invention as it is seen from vertically above it. This embodiment is similar in the main construction to the first embodiment. A visible laser beam emitted from a laser beam generator 5 is sent to a collimator lens system 6' or 6" depending on the direction of a rotatable mirror 7' mounted on a motor 10' driven by a timing circuit 3. The former state is defined as state 3, and the latter state is defined as state 4. In state 3, the laser beam is directed to the collimator lens system 6' by the rotatable mirror 7' and a mirror 11. The laser beam is made into a parallel beam of a wide beam diameter by the collimator lens system 6', and is converted by a lens 14 of focal length f into such a beam of light which converges at a point P, and the beam of light transmitted through a half mirror 13 enters a liquid crystal display 1. On the other hand, in state 4, the laser beam is made into a parallel beam of a wide beam diameter by the collimator lens system 6" and intactly passes a mirror 12 and through an aperture 15, and the beam of light reflected by the half mirror 13 enters the liquid crystal display 1. These changes in the state of the illuminating light are controlled by the timing circuit 3 in synchronism with the display of the interference fringe pattern onto the liquid crystal display.

FIGS. 5A and 5B enlargedly show the relations between the liquid crystal display and the illuminating and reconstructing lights in state 3 and state 4. The reconstructing method in the present embodiment will hereinafter be described with reference to FIGS. 5A and 5B.

Plane N is a boundary plane for setting to divide the image reconstructing areas in state 3 and state 4 as will be described later. The plane N is not always a flat plane. For the simplification of the description, let it be assumed that the three dimensional image to be reconstructed lies on the z-axis of the liquid crystal display and in an area more toward the observer than a point P.

It is apparent from FIG. 5A that in state 3 shown in FIG. 5A, the deflection angle of the ray of light (the deflection angle of the angle of emergence of the reconstructing light relative to the angle of incidence of the illuminating light) at the end points C and D on the liquid crystal display becomes greatest on the liquid crystal display as compared with that at the other points. Further, the deflection angle $\beta$ of the ray of light at the point C or D when any point B on this side of the plane N (the side far from the liquid crystal display) is reconstructed is always greater than the deflection angle $\alpha$ of the ray of light at the point C or D when any point A on the inner side from the plane N (the side near to the liquid crystal display). To deflect the ray of light more greatly y a diffraction grating, it is necessary to make the grating pitch smaller. Consequently, it will be seen that in state 3, an interference fringe pattern of a higher spatial frequency is required when any point B on this side of the plane N (the side far from the liquid crystal display) is reconstructed. This also holds true of the case of state 4. In state 4 shown in FIG. 5B, when any point A on the inner side from the plane N (the side near to the display) is reconstructed and when any point B on this side of the plane N (the side far from the display) is reconstructed, an interference fringe pattern of a higher spatial frequency is required in the former case. So, in the present embodiment, the state of the illuminating light and the interference fringe pattern displayed are changed over in synchronism with each other so that in state 3, only the area nearer to the display than to the plane N may be reconstructed and that in state 4, only the area farther from the display than from the plane N may be reconstructed. Alternatively, the illuminating lights in state 3 and state 4 may be caused to enter the liquid crystal display at a time and the interference fringe patterns corresponding to the above-described respective states may be changed over at a high speed. By effecting these changeovers at a high speed (i.e., by changing over the interference fringe pattern within 1/60 second), the observer can observe continuous three dimensional images including the points A and B at a time owing to the afterimage effect.

In this case, the plane N is considered to be such a boundary plane that even if reconstruction is effected by the illuminating light in state 3 or the illuminating light in state 4, the maximum spatial frequency of the interference fringe pattern to be displayed on the liquid crystal display becomes equal, and if the state of the illuminating light in each state, the range of the reconstructed image, etc. are determined, the plane N can be primarily defined as a curved surface comprising a spherical surface or an aspherical surface. Consequently, the condition that "the three dimensional image displayed lies on the z-axis of the liquid crystal display" previously assumed to simplify the description can be easily dismissed by the right definition of the plane N, and the above-described method can be applied to the more general reconstruction of three dimensional images.

By the method described above, again in the second embodiment, there can be obtained effects entirely similar to those of the first embodiment (the suppression of the maximum spatial frequency of the interference fringe pattern and the reduction in the amount of information).

(Third Embodiment)

Figure 6A:
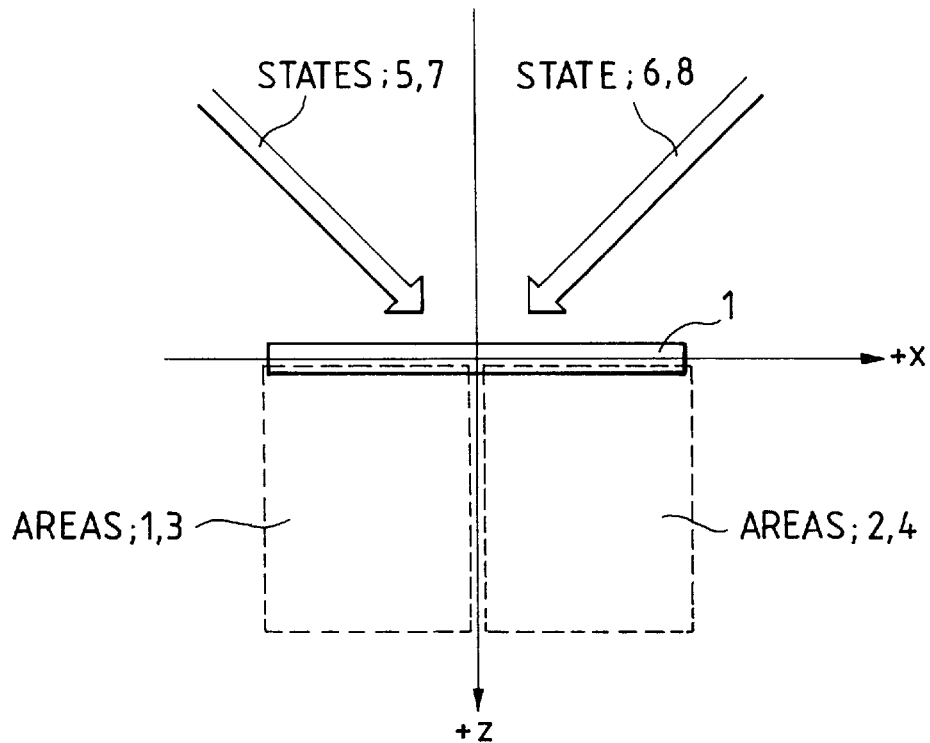
FIGS. 6A and 6B show the construction of the essential portions of still another embodiment of the present invention.
Figure 6B:
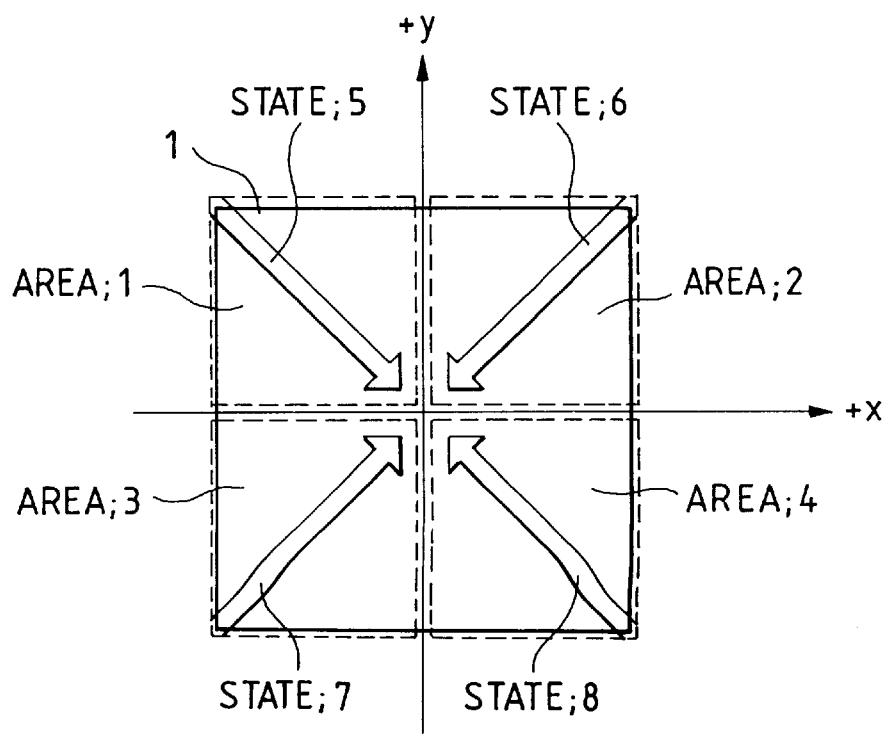

The main construction of a real time hologram reconstructing apparatus which is a third embodiment of the present invention is similar to that of the first embodiment except for the direction of incidence of illuminating light. Consequently, the illuminating method and the image reconstructing method will hereinafter be described with reference to FIGS. 6A and 6B, but the specific description of means for causing illuminating light to enter the liquid crystal display from a different direction will be omitted. The setting of the coordinates space is similar to FIG. 3C which shows the relations among the liquid crystal display, the illuminating light and the direction of the observer in the first embodiment. FIG. 6A is a view of the present apparatus as it is seen from the y-axis positive direction, and FIG. 6B is a view of the present apparatus as it is seen from the z-axis positive direction. In the present embodiment, the illuminating light presents four states, i.e., states 5 to 8. The illuminating light in each state is a parallel beam of light. In state 5, the illuminating light propagates in the direction from a point (x, y, z)=(-1, +1, -1) toward the origin (0, 0, 0), and in state 6, the illuminating light propagates in the direction from a point (+1, +1, -1) toward the origin (0, 0, 0), and in state 7, the illuminating light propagates in the direction from a point (-1, -1, -1) toward the origin (0, 0, 0), and in state 8, the illuminating light propagates in the direction from a point (+1, -1, -1) toward the origin (0, 0, 0), and the respective beams of light enter the whole surface of the liquid crystal display. Again in the present embodiment, as in the other embodiments, in order to suppress the maximum spatial frequency of the interference fringe pattern displayed on the liquid crystal display to a low level, an optimum reconstruction area is selected in conformity with each state of the illuminating light and is changed over at a high speed. Each reconstruction area is a z-coordinates positive area comprising four areas divided by xz plane and yz plane. Of these areas, the area including a point (-1, +1, +1) is defined as area 1, the area including a point (+1, +1, +1) is defined as area 2, the area including a point (-1, -1, +1) is defined as area 3, and the area including a point (+1, -1, +1) is defined as area 4. In the present embodiment, the state of the illuminating light and the interference fringe pattern displayed are changed over in synchronism with each other so that the image of the area 4 may be reconstructed in state 5, the image of the area 3 may be reconstructed in state 6, the image of area 2 may be reconstructed in state 7 and the image of area 1 may be reconstructed in state 8, and in each state, the maximum spatial frequency of the interference fringe pattern displayed on the liquid crystal display is suppressed to a low level. Also, by changing over the interference fringe pattern within 1/60 second, the observer can observe the reconstructed images reconstructed in areas 1 to 4 as a continuous three dimensional image owing to the afterimage effect.

By the method described above, effects similar to those of the first embodiment (the suppression of the maximum spatial frequency of the interference fringe pattern and the reduction in the amount of information) can also be obtained in the real time hologram reconstructing apparatus wherein the state of the illuminating light is changed over in multiple stages as in the present embodiment.

In all the embodiments hitherto described, changing the construction as follows is effective to enlarge the range of application of the present apparatus without hampering the essential effects of the present invention. Also, any of the described methods can be easily achieved by only changing a part of the method used in all of the above-described embodiments.

Instead of the spatial light modulator of the transmittance modulating type, a spatial light modulator of the phase modulating type is used to construct a real time hologram reconstructing apparatus of the phase type having higher diffracting efficiency.

Instead of the spatial light modulator of the transmission type, a spatial light modulator of the reflection type is used to construct a real time hologram reconstructing apparatus of the reflection type.

A real time hologram reconstructing apparatus is constructed in which the image reconstruction area is not limited to the side nearer to the observer than to the spatial light modulator, but the image reconstruction on the side farther from the observer than from the spatial modulator is also taken into account.

A real time hologram reconstructing apparatus is constructed in which the illuminating light used is not limited to parallel light or spherically converged light, but divergent light, a beam of aspherical wave light or the like is used.

A real time hologram reconstructing apparatus is constructed in which the illuminating light source used is not limited to one, but a plurality of light sources are used or an optical system is used to further divide the illuminating lights from the plurality of light sources.

A real time hologram reconstructing apparatus is constructed in which the wavelength of the illuminating light used is not limited to one, but a plurality of wavelengths are used to effect multicolor or full color image reconstruction.

A laser diode or an LED light source is used as the laser beam generator.

Also, in the above-described embodiments, the state of the illuminating light is changed over in two stages or four stages, but three stages or more stages may also be adopted. In short, design can be made such that the reconstructed image is divided into a plurality of areas and the illuminating light enters the interference fringe forming means from such a direction that the maximum spatial frequency of the interference fringe pattern on the interference fringe forming means becomes as low as possible to the respective divided reconstructed images.

Further, by making at least some of the reconstruction areas overlap each other, the observer can recognize the overlapping areas at high resolution.

The invention may be embodied in other specific forms without departing from the spirit or essential characteristics thereof. The above embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hologram reconstructing apparatus comprising:

a spatial light modulator for changing a light transmission or reflection area thereof so as to display fringe patterns on a single same area whenever the apparatus reconstructs images, said light modulator being controlled in accordance with an input signal;

drive means for driving said spatial light modulator by supplying the input signal to the spatial light modulator, wherein said drive means changes said fringe patterns displayed, and said drive means selectively changes over a plurality of different interference fringes to be displayed on a position of the same single area of said spatial light modulator; and illuminating means for illuminating each of said fringe patterns on the same single area of said spatial light modulator with a beam of light corresponding to each of said fringe patterns wherein each of the plurality of beams of light illuminates each of said fringe patterns with a mutually different illumination condition, so that hologram images based on each of said plurality of beams are reconstructed in a reconstructing area, wherein said drive means selects only one pattern of interference fringe to be displayed on said spatial light modulator at a time with respect to said illumination condition and displays the selected pattern of interference fringes on said spatial light modulator.

2. The apparatus according to claim 1, wherein the reconstruction areas of hologram images based on each of said fringe patterns differ from one another.

3. The apparatus according to Claim 1, wherein said illuminating means illuminates said fringe patterns with said beams of light differing in wave front from one another in synchonism with said input signal.

4. The apparatus according to claim 2, wherein the hologram images of which said reconstruction areas differ from one another form a continuous three dimensional image.

5. The apparatus according to claim 2, wherein said drive means changes said fringe patterns displayed within $\frac{1}{60}$ second.

6. An apparatus according to claim 2, wherein said illuminating means makes light beams whose wavefronts are mutually different simultaneously incident on said fringe patterns.

7. An apparatus according to claim 2, wherein said illuminating means makes light beams whose wavefronts are mutually different incident on said fringe patterns.

8. An apparatus according to claim 1, wherein a single combination of said interference fringe patterns and illumination conditions is so selected from among a plurality of combinations thereof by said drive means as to minimize the maximum value of spatial frequency of said interference fringe pattern.

9. An apparatus according to claim 2, wherein a single combination of said reconstructing area and illumination conditions at a time is so selected from among a plurality of combinations thereof by said drive means as to minimize the maximum value of spatial frequency of said interference fringe pattern.

* * * * *

UNITED STATES PATENT AND TRADEMARK OFFICE
CERTIFICATE OF CORRECTION

PATENT NO. : 5,986,780
DATED : November 16, 1999
INVENTOR(S) : Toshiyuki Sudo

It is certified that error appears in the above-identified patent and that said Letters Patent is hereby corrected as shown below:

ON THE TITLE PAGE

Under [56] References Cited, U.S. Patent Documents, delete "359/322" and insert therefor -- 359/32 -- for 4,889,780 to Cosner.

IN THE SPECIFICATION

Column 5, line 16, after "greatly" delete "y" and insert therefor -- by --.

Signed and Sealed this

Tenth Day of April, 2001

*Attest:*

NICHOLAS P. GODICI

*Attesting Officer*   Acting Director of the United States Patent and Trademark Office